(12) United States Patent
Kerler

(10) Patent No.: US 9,149,021 B2
(45) Date of Patent: Oct. 6, 2015

(54) ANIMAL PAW PAD

(71) Applicant: Carol Marie Kerler, Garden City, NY (US)

(72) Inventor: Carol Marie Kerler, Garden City, NY (US)

(*) Notice: Subject to any disclaimer, the term of this patent is extended or adjusted under 35 U.S.C. 154(b) by 0 days.

(21) Appl. No.: 13/759,286

(22) Filed: Feb. 5, 2013

(65) Prior Publication Data

US 2013/0319346 A1  Dec. 5, 2013

Related U.S. Application Data

(63) Continuation-in-part of application No. 13/747,158, filed on Jan. 22, 2013, now abandoned.

(60) Provisional application No. 61/653,886, filed on May 31, 2012, provisional application No. 61/653,886, filed on May 31, 2012.

(51) Int. Cl.
*A01K 29/00* (2006.01)
*A01L 9/00* (2006.01)
*A01K 13/00* (2006.01)

(52) U.S. Cl.
CPC .............. *A01K 29/00* (2013.01); *A01K 13/007* (2013.01); *A01L 9/00* (2013.01)

(58) Field of Classification Search
USPC .................. 119/850, 856; 54/82; 36/59 R, 62
See application file for complete search history.

(56) References Cited

U.S. PATENT DOCUMENTS

| | | | |
|---|---|---|---|
| 4,510,699 A * | 4/1985 | Nakamura et al. | 36/43 |
| 5,452,685 A | 9/1995 | Thomas | |
| 5,485,687 A * | 1/1996 | Rohde | 36/62 |
| 5,551,173 A * | 9/1996 | Chambers | 36/44 |
| 6,122,901 A * | 9/2000 | Schultz et al. | 54/82 |
| 6,672,254 B1 * | 1/2004 | Butts | 119/711 |
| 6,863,033 B1 | 3/2005 | Fleming | |
| 8,091,963 B2 * | 1/2012 | Wyner et al. | 297/214 |
| 8,468,978 B1 * | 6/2013 | Romero | 119/850 |
| 8,871,328 B2 * | 10/2014 | Wyner et al. | 428/156 |
| 2002/0004996 A1 * | 1/2002 | Scheucher | 36/62 |
| 2004/0006814 A1 | 1/2004 | Holden | |
| 2005/0188925 A1 * | 9/2005 | Yun et al. | 119/850 |
| 2005/0274043 A1 * | 12/2005 | DeSaix | 36/59 R |
| 2006/0053660 A1 * | 3/2006 | Lewton | 36/59 R |
| 2007/0044734 A1 | 3/2007 | Maloney et al. | |
| 2007/0089691 A1 | 4/2007 | Hendy | |
| 2007/0227464 A1 * | 10/2007 | Axelrod et al. | 119/709 |
| 2007/0261274 A1 * | 11/2007 | Fox et al. | 36/154 |
| 2009/0090031 A1 * | 4/2009 | Jung | 36/59 C |
| 2011/0041779 A1 * | 2/2011 | Hurwitz | 119/850 |
| 2011/0041780 A1 | 2/2011 | Hurwitz | |
| 2011/0077608 A1 * | 3/2011 | Macedo, Jr. | 604/385.01 |
| 2013/0340685 A1 * | 12/2013 | Grepper | 119/709 |

OTHER PUBLICATIONS

International Search Report of PCT/US2013/033764 and Written Opinion of the International Searching Authority, dated Jul. 1, 2013, 13 pages.

* cited by examiner

*Primary Examiner* — David Parsley
*Assistant Examiner* — George Andonyan
(74) *Attorney, Agent, or Firm* — Collard & Roe, P.C.

(57) ABSTRACT

An animal paw pad comprising a base having an enclosure, wherein said base has a first side and a second side disposed opposite of said first side. There can be a gel disposed inside of the enclosure. There can be at least one adhesive coupled to the first side, and at least one roughened section coupled to the second side.

28 Claims, 8 Drawing Sheets

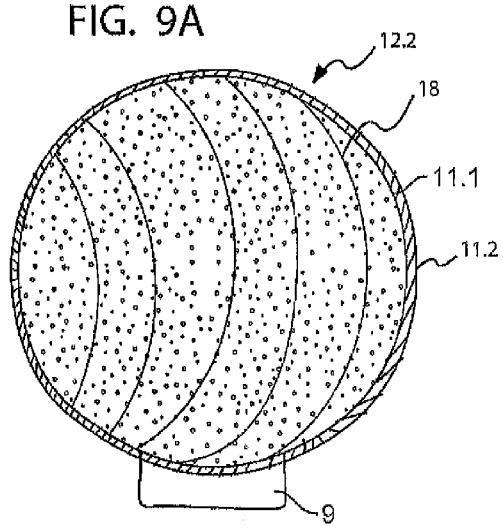
FIG. 9A
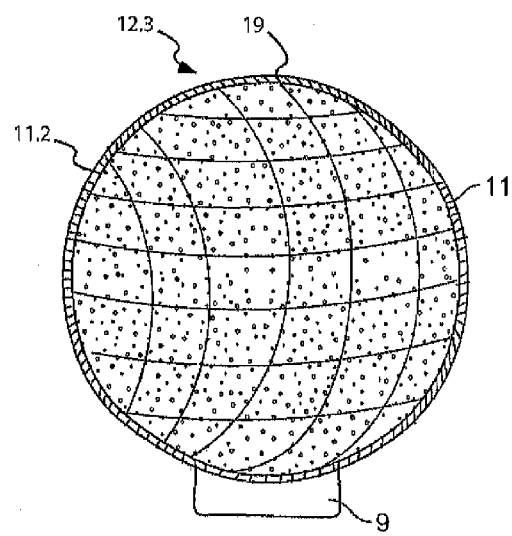
FIG. 9B
FIG. 9C
FIG. 9D
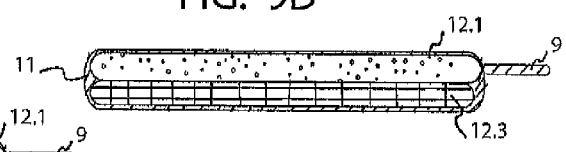
FIG. 9E
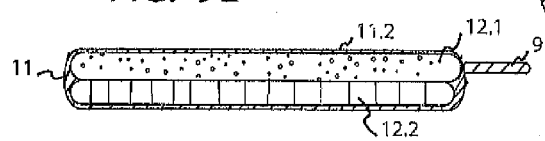
FIG. 9F
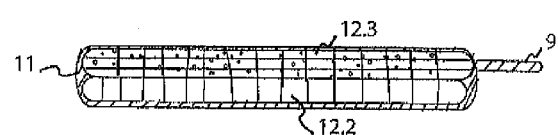

ANIMAL PAW PAD

CROSS REFERENCE TO RELATED APPLICATIONS

This application is a continuation in part application of U.S. patent application Ser. No. 13/747158 filed on Jan. 22, 2013, which is a non-provisional application that claims priority under 35 U.S.C. 119e from provisional application Ser. No. 61/653,886 filed on May 31, 2012, this application also claims priority under 35 U.S.C. 119e from provisional application Ser. No. 61/653,886 field on May 31, 2012, the disclosure of these applications hereby being incorporated herein by reference in their entirety.

BACKGROUND OF THE INVENTION

The invention relates to an animal paw pad which is configured to fit on a paw of an animal. The pad can have an adhesive on one side and a pad disposed on the opposite side. The gel paw pad would protect an animal's paws from burns and blisters caused by walking on hot concrete pavement, blacktop, tarmac, gravel, boat decks/docks, boardwalks, or sand—in addition to protecting paws against ice and salted roads in the winter. Paw pads would protect the animal's four paws during a walk outdoors in extreme heat or cold. Climate change is causing intense, long-term heat waves. Paw injuries are treated after the fact—not pro-actively avoided. Thus, there is a need for protective gel paw pads.

SUMMARY OF THE INVENTION

At least one embodiment of the invention relates to an animal paw pad comprising a substantially flat pad contoured to fit the shape and size of the underside of a paw. The pad has two sides: the top side is an aerated surface of soft gel with five embedded oval adhesive patches and a gel tab extending from the back; the bottom side is an aerated surface of soft gel. The gel tab extending from the back of the pad could be a solid gel—not porous. The top side can have a plurality such as five small oval adhesive patches configured to adhere to the five pressure points (pads before toes and central pad) on the bottom of an animal's paw. The adhesive on each of the five oval patches should be a "super stick" formula similar to the formula for the adhesive portion of an adhesive bandage. The precise sizing of the oval adhesive patches is variable, dependent upon the strength of the "super stick" formula to hold the gel pad in place on the five pressure points of the paw. The "super stick" adhesive ovals embedded in the top side may have a non-permeable barrier between the adhesive and the gel, to ensure that the adhesive will not seep through or ooze to the bottom side, which could cause a sticking effect on the bottom of the pad when the animal walks. The number of oval adhesive patches is variable, according to the paw structure of the animal/breed.

The top side has a small gel tab extending from the back of the paw pad that can be gripped to peel off the adhesive-fixed pad after use, without causing discomfort to the animal.

The entire gel pad should be manufactured of soft gel (having similar chemical composition to the mixture coating of a pill), so that it would dissolve in the mouth/digestive system of an animal if the animal chewed off and swallowed the paw pad. The gel pad is nontoxic, hypoallergenic, biodegradable, and will dissolve if ingested by an animal. The "super stick" formula adhesive to affix the top of the pad to the paw must be nontoxic, hypoallergenic, and harmless if the pad is ingested. Any non-permeable barrier between adhesive and gel pad must also be nontoxic and harmless if the pad is ingested.

In at least one embodiment, the entire gel pad is aerated with minute holes; it may also have raised striated ribs, or be otherwise treaded, striated, dimpled, porous, honeycombed, or ribbed in design to create a thin pad that would protect the paw. The soft gel may be colored blue.

In at least one embodiment, the entire gel pad should comprise a thickness of approximately 2.12 millimeters ($1/12$ of an inch). The gel pads would be affixed by the top adhesive side to a contact sheet similar to the contact sheet that covers the adhesive portion of an adhesive bandage such as a Band-Aid@ brand adhesive bandage. The animal paw pads would be manufactured in different sizes for small, medium, and large animals, and customized as appropriate by breed. The approximate thickness of the entire gel pad may be is thicker than 2.12 millimeters for large, heavy animals, and may be thinner for small animals. The gel tab at the back of the pad may measure approximately 1.4 millimeters in thickness, while the gel tab may be 18 millimeters wide and 18 millimeters long. The dimensions of the gel tab may vary to be in proportion to the overall size and thickness of the customized gel paw pad.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 9A is a view of another embodiment of the paw pad; and

FIG. 9B is a view of another embodiment of the paw pad; and

FIG. 9C is a side view of another embodiment of the paw pad; and

FIG. 9D is a side view of another embodiment of the paw pad; and

FIG. 9E is a side view of another embodiment of the paw pad; and

FIG. 9F is a side view of another embodiment of the paw pad; and

FIG. 10A is a view of another embodiment of a paw pad having a different shape;

DETAILED DESCRIPTION OF PREFERRED EMBODIMENTS

Figure 1:
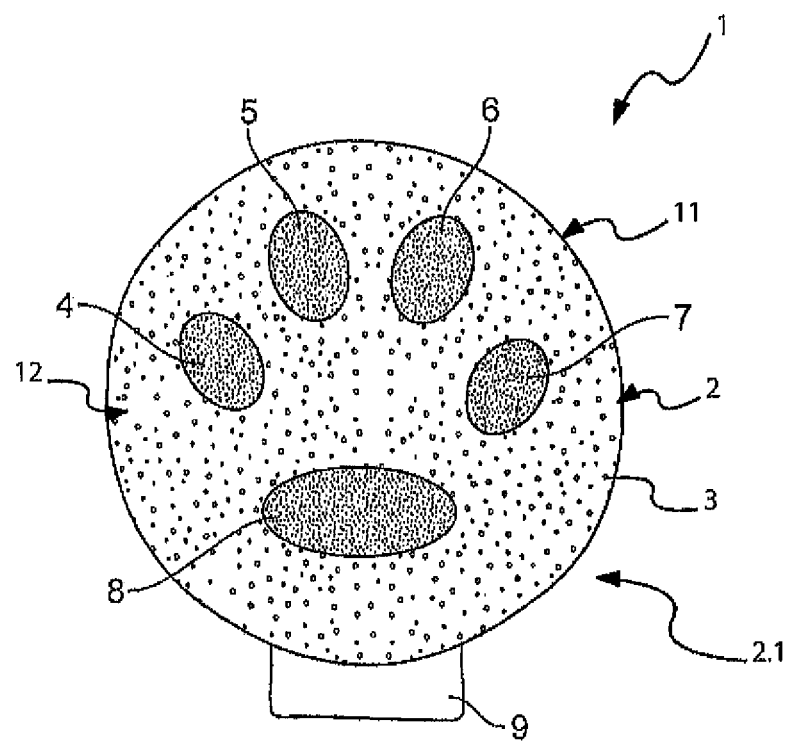
FIG. 1 is a first side view of a paw pad.
Figure 2:
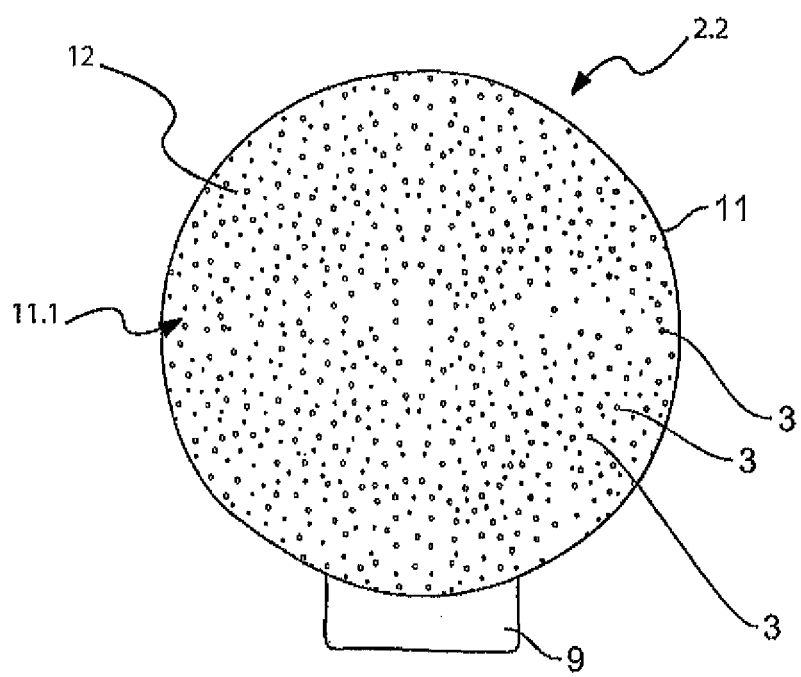
FIG. 2 is a back side view of a paw pad.

Turning now in detail to the drawings, there is disclosed an animal paw pad 1 comprising a base 2 having an enclosure 11. The base 2 has a first side 2.1 and a second side 2.2 (see FIG. 2) disposed opposite of first side 2.1. While the paw pad can be made of any material, the inside of the paw pad can be a gel 12 disposed inside of the enclosure 11 in an interior section 11.1 forming the pad base 2. The base can have a plurality of perforations 3 extending there-through, in addition, there can be at least one adhesive 4, 5, 6, 7, 8 coupled to the first side 2.1 forming an adhesive section. Disposed on the opposite side 2.2 there can be a standard enclosure surface or an optional roughened section. The adhesive can be in the form of any suitable adhesive, such as a sticky pad, a gel adhesive, a glue, a silicone-based adhesive or any other suitable type of adhesive. In at least one embodiment, the adhesive such as adhesive 4, 5, 6, 7, 8, can be an adhesive that is similar to that used with commonly known adhesive bandages such as Band-Aid® brand adhesive bandages. Extending out from one end of the pad, is a tab 9. Tab 9 is in the form of flap which allows a user to remove a base covering from it when it is bent over. Essentially, when a person bends tab 9 over, it allows tab 9 to be separated from a covering which covers the adhesive sections 4, 5, 6, 7, and 8. The user can then peel away the covering thereby exposing the adhesive sections (see coverings 10 and 15 in FIG. 8).

Once a covering is peeled away, and the adhesive sections are exposed, the user can then stick pad 1 to the underside of an animal's foot such as to a dog's foot or paw or a cat's foot or paw. The adhesive sections are spaced apart so as to roughly approximate the placement of the skin type surfaces for a paw, which will vary by breed/size. The tab 9, positioned behind the back heel of the paw pad, enables removal of the pad from the sole of the paw after use. The user can raise the paw and pull tab 9 downward from the back-to-the-front of the paw to peel off the adhered paw pad after use, without causing discomfort to the animal.

Figure 3:
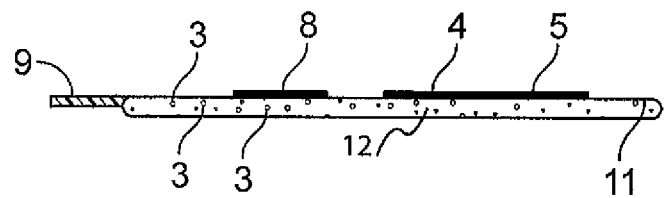
FIG. 3 is a side view of the paw pad.

FIG. 3 is a side cross-sectional view of the paw pad which shows an outer cover 11, which can also contain a gel 12 inside. In addition, as shown, there is a tab 9 extending out from one side of the pad. The inside section 1 of the paw pad can be filled with gel or any other type of spongy or flexible material, such as a soft edible gum or soft chew product approved for animals. Both the paw pad exterior 11 and the interior 11.1 can be made from an edible, biodegradable material. In this way the paw pad can be ingested by an animal and then either easily expelled by that animal or digested by the animal. In that way the animal does not get sick if the animal should try to eat, or eats the paw pad.

Figure 4:
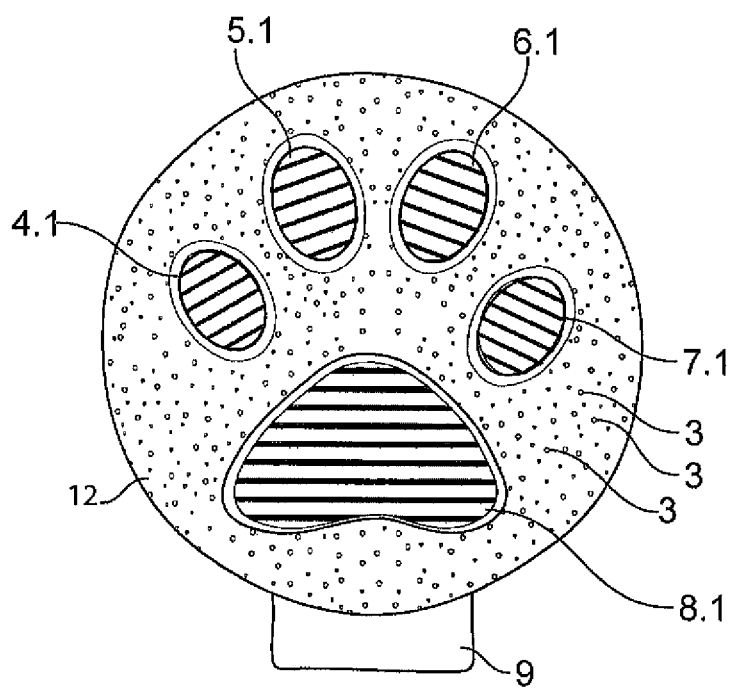
FIG. 4 is a first side view of another embodiment of a paw pad.

FIG. 4 is another view of a paw pad which shows the bottom side of the paw pad. This bottom side of the paw pad includes a plurality of different sections 4.1, 5.1, 6.1, and 7.1 and 8.1 which are roughened sections and which are disposed approximately opposite of the adhesives 4, 5, 6, 7 and 8 respectively which are disposed on the opposite side. The roughened sections would provide for a non-permeable barrier to be set between the adhesive ovals and the gel pad.

Figure 5:
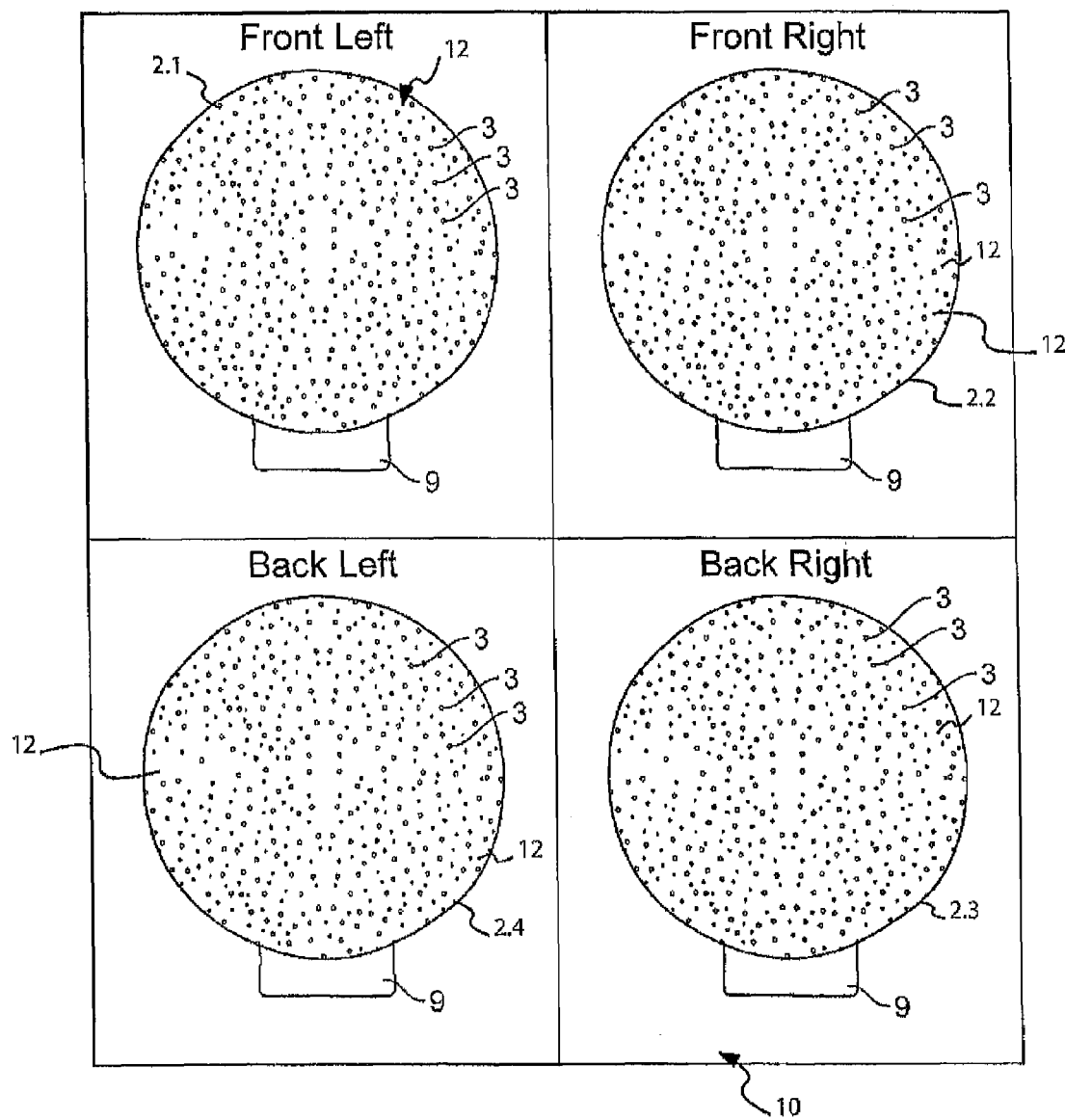
FIG. 5 is a sample view of one side of four different paw pads for four different paws.

The different paw pads can be placed on the different paws of a user. For example, FIG. 5 shows a sheet 10 which has different paw pads. For example, there is a view of a paw pad 2.1 for a front left paw; a view of a paw pad 2.2 for a front right paw; a view of a paw pad 2.3 for a back right paw; and a view of a paw pad 2.4 for a back left paw.

Figure 6:
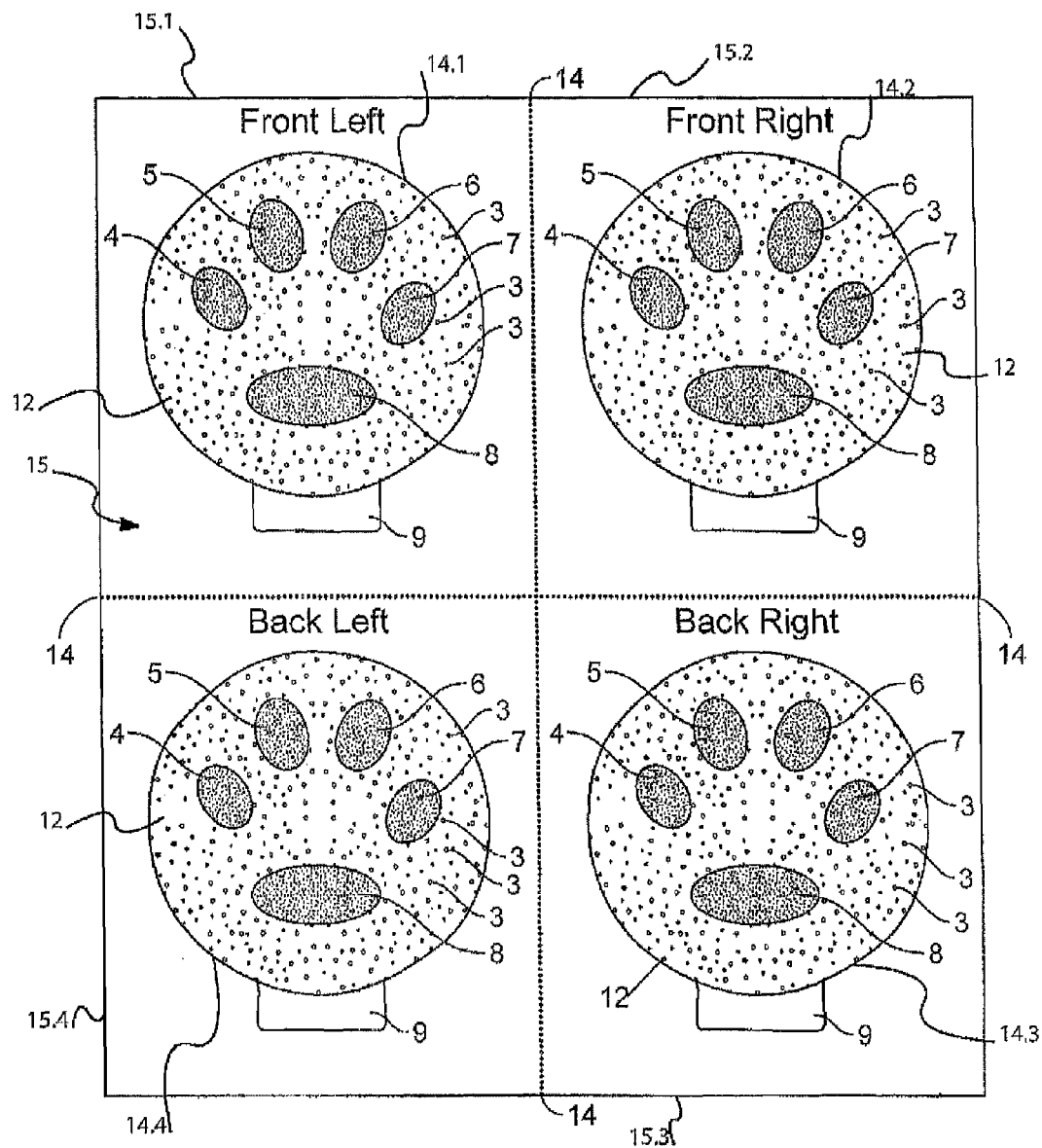
FIG. 6 is a view of an opposite side of the different paw pads shown in FIG. 5.

FIG. 6 is a view of a sheet 15 of paw pads which include a plurality of different sections 15.1, 15.2, 15.3, and 15.4 of paw pads 14.1, 14.2, 14.3, 14.4 separated by perforation lines 14. This view shows the associated adhesives 4, 5, 6, 7 and 8 for the different paw pads. This thin, flexible, easily handled sheet presents a packaging option for the paw pads. The pet owner simply peels away each of the different paw pads 14.1, 14.2, 14.3, 14.4, from the different sections 15.1, 15.2, 15.3, and 15.4 to apply the pads to the soles of their pet's paws. Each paw pad is sectioned to avoid the pads sticking to each other, and to quickly identify by right/left/front/back paw to adhere the pads to their pet. Perforations between each of the four paw pads enable each pad to be applied individually.

The packages could be refrigerated to enhance the cooling protection of the gel paw pads against hot surfaces. The different sections 15.1, 15.2, 15.3 and 15.4 form contact sheet sections to encase the pads, so that the pads can be easily peeled off and then put into use. In at least one embodiment the pads can be put into a contact sheet where it is covered on both sides by the contact sheet. The contact sheet can be placed on the floor adhesive-side up. One side of the contact sheet can be peeled back to separately expose each of the four pads with the sticky oval patches. The pet owner can then direct each of the animal's four paws to accurately step onto each of the four pads. The paws of the animal would be impressed against the sticky patches as they stand on the pads, so the gel pads would adhere to each paw for immediate use. The contact sheet may illustrate four full-sized paws with stenciled outlines as guidelines to press the animal's paws downwards to easily meet the adhesive ovals of each pad for a targeted fit on the pressure points of the paw.

Figure 7:
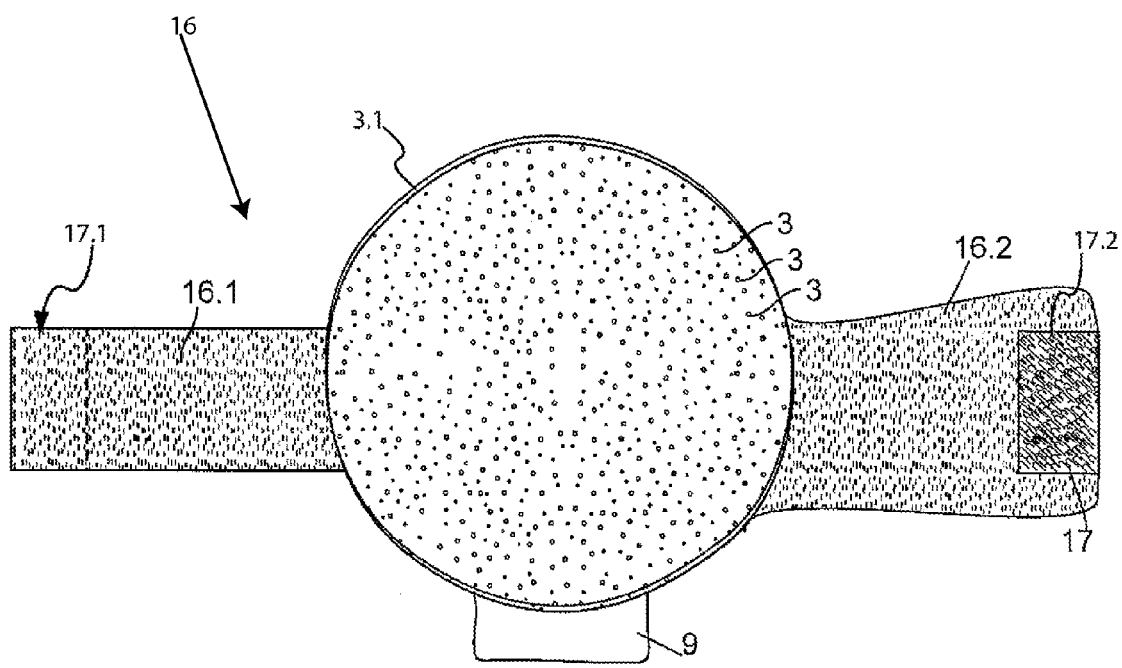
FIG. 7 is a view of a paw pad having a strap with fastener.

FIG. 7 is a view of a paw pad having a strap with fastener. With this embodiment, there is a paw pad which is in the form of a strap based paw pad having a first strap end 16.1 and a second strap end 16.2. The strap 16 can be of any suitable shape such as rectangular, cone, circular arc, or hourglass shaped. For example, first strap end 16.1 is shown as rectangular, while second end strap is shown with an hourglass shape. Both ends can be hourglass shaped or they can be rectangular or any suitable shape. This strap 16 has a fastener having a first end 17.1 and a second complementary end 17.2 forming a fastener 17. The fastener 17.1 and 17.2 can be in the form of any suitable fastener such as Velcro®, a hook and loop fastener, an adhesive, a clasp, apertures with lacing, non-stick surgical tape, or any other suitable type of fastening instrument. The partial upper would be a flexible porous gel mesh, and the fasteners would be adjustable. This view also shows a solid gel area which surrounds the pad. The solid gel area provides a more solid surrounding area for the pad so that the pad can retain its shape. Each of these designs can be configured to have a solid gel area surrounding them as well.

With this design of a gel sole and partial upper of porous gel mesh, the user can instead of, or as an alternative to using adhesive, attach a pad to a pet's foot as a reusable pad using the strap. Since the strap can be selectively connected or disconnected, this allows for easy removal of the strap and pad from the pet's foot.

Figure 7A:
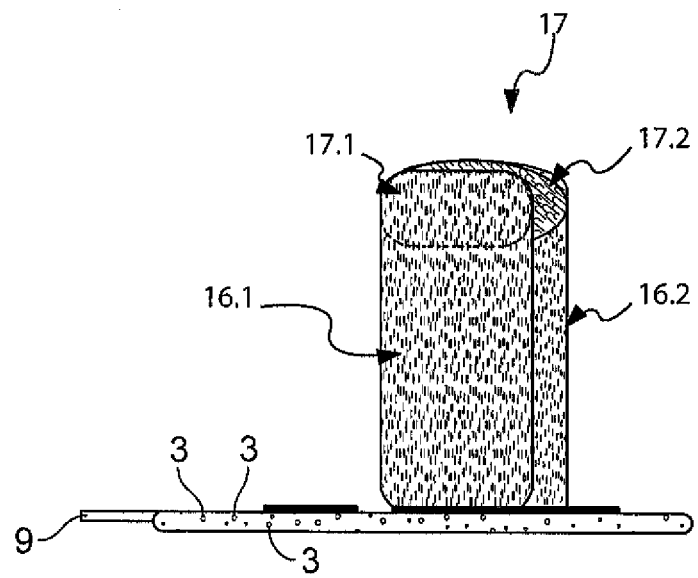
FIG. 7A is a side view of a paw pad having a strap with fastener.

FIG. 7A is a side view of a pad having a partial upper with strap and this view shows the two ends of the strap 16.1 and 16.2 being joined at a fastener 17 including fastener end sections 17.1 and 17.2. This strap can be of any shape as shown by FIG. 7 and can be of any suitable width or length to wrap around an animal's paw to keep the pad on the animal.

This paw pad can also have adhesive sections such as adhesive sections 4, 5, 6, 7, 8 and can also be covered by coverings 10 and 15.

Figure 8:
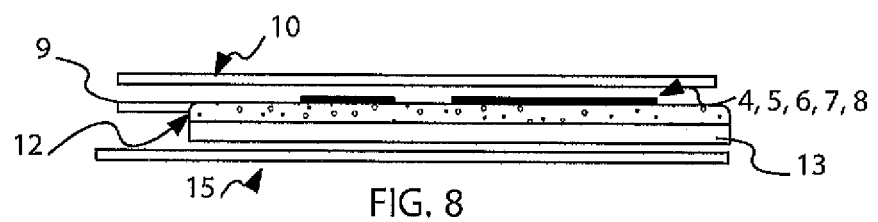
FIG. 8 is a side view of another embodiment of the paw pad with two layers.

FIG. 8 is a side view which shows a middle pad section 2, adhesives 4-8 and a general roughened section 13 disposed on the side opposite the adhesives. With this view, there is shown a plurality of different layers which provides the values of added insulation and support for the animal. This view also shows a side view of a covering such as sheets 10 and 15 which cover both sides of the pad and which can be peeled away from the pad to expose the adhesive sections 4, 5, 6, 7, 8 as well as the opposite non adhesive sides as well.

FIG. 9A shows another view which shows a front view which shows a striated aerated pad which includes a plurality of striation lines 18 along with aeration holes 3 disposed therein. These striation lines help to keep the pad flexible so that it can bend and flex according to the pet's needs. There is also a solid gel area 11.2 around the periphery of the pad 1 as well. FIG. 9B shows a quilted pad having a quilt 19 within the gel portion of the pad. With this embodiment there is a solid gel region 11.2 as well as at the periphery of the pad. The tab 9.1 of both the embodiments 9A and 9B are also solid gel as well.

FIG. 9C is a side cross-sectional view of a pad which includes a solid gel region on the periphery 11.2 as well as a gel region 12 having aeration holes as well. There is a tab 9.1 positioned at the end, wherein this tab can be made from solid gel. FIG. 9D is a side view of a two layer pad which includes a gel region 12.1 as well as a quilted gel region 12.3 disposed inside of a casing or enclosure 11. The casing or enclosure 11 can secure the two regions therein. These two regions may be separated by a first enclosure and a second enclosure. A tab 9.1 of solid gel is disposed on an end region as well.

FIG. 9E is a side cross-sectional view of a pad having a first gel region 12.1 and a second striation region 12.2 to form a two layer pad. The multiple layer option would provide larger dogs with added durability and flexibility for use in extreme weather.

FIG. 9F is a cross-sectional view of another pad which includes a first section 12.3 which is a quilted gel region and a second section 12.2 which is a striation gel region as well. This two layer pad has a tab 9.1 which is made of solid gel as well.

Figure 10C:
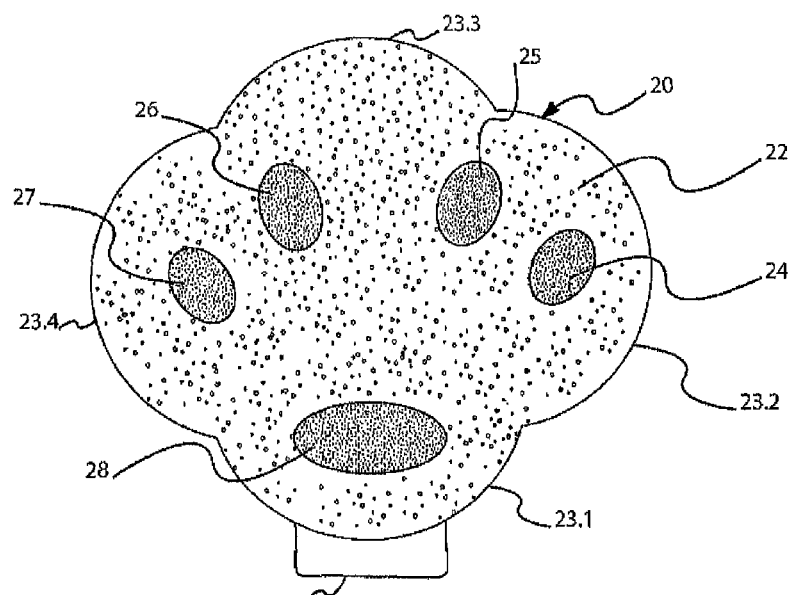
FIG. 10C is a view of another embodiment of a paw pad having a different shape.
Figure 10B:
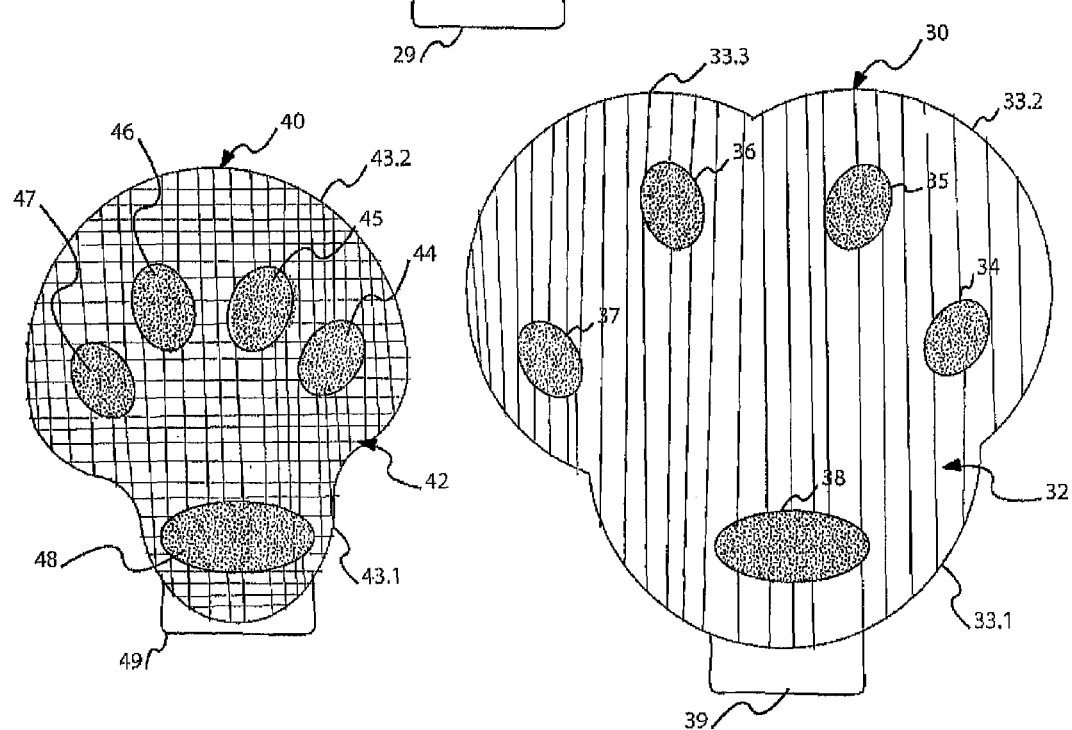
FIG. 10B is a view of another embodiment of a paw pad having a different shape.

FIG. 10A is a side view of another embodiment of the invention. This embodiment is a different shaped gel pad which is shaped particularly for an animal's paw. Different shapes of animal's paws can be accommodated with these gel pads. For example, this shape can be customized for a German Shepherd, or a dachshund or any other suitable breed. This paw pad can have different extending sections 23.1, 23.2, 23.3, and 23.4 including a first, second, third and fourth extending section respectively, and adhesive sections 24, 25, 26, 27, and 28, with a tab 29. The interior region of this paw pad 22 can be in the form of an aerated gel. FIG. 10B can be a paw pad 30 of a different shape and size having sections 33.1, 33.2, and 33.3 which extend out to receive different parts of an animal's paw. This paw pad includes a paw pad having adhesive sections 34, 35, 36, 37, and 38 and a tab 39. In this embodiment the interior region 32 is striated as shown by the striation lines. FIG. 10C is a paw pad 40 having sections 43.1 and 43.2 with adhesive sections 44, 45, 46, 47 and 48 with a tab 49. The interior region 42 is a quilt/gel combination.

The different sizes, shapes and thicknesses of paw pads 10A-10C can be used with any of the paw pads shown in FIGS. 9A-9F or with any of the paw pads shown in FIGS. 1-8 as well.

These animal paw pads can be used for different animals with different thicknesses and different consistencies to suit the animals that would use them. The number and placement of adhesive ovals will be different for each animal by size and breed. The perimeters of any embodiment of the pads may be rimmed by a band of solid gel to encase the spongy aerated gel. A webbed pattern of solid gel lines may be embedded in the spongy aerated gel. The different ways to attach these paw pads, such as via an adhesive or strap, allows these paw pads to be adhered to different paws in different manners.

The reference numerals and their corresponding terms are outlined below:

1 pad
1.1 second embodiment
2 base
2.1 first side
2.2 second side
3 aeration holes
4 adhesive
4.1 roughened section/non-permeable barrier
5 Adhesive
5.1 roughened section/non-permeable barrier
6 Adhesive
6.1 roughened section/non-permeable barrier
7 Adhesive
7.1 roughened section/non-permeable barrier
8 Adhesive
8.1 roughened section/non-permeable barrier
9 tab
10 sheet
11 enclosure
11.1 interior section
11.2 second type of interior section
12 gel
12.1 first gel region
12.2 second striation region
12.3 quilted gel region
13 roughened section
14 perforation lines
14.1 first pad
14.2 second pad
14.3 third pad
14.4 fourth pad
15 sheet
15.1 first section
15.2 second section
15.3 third section
15.4 fourth section
16.1 first strap end
16.2 second strap end
17 fastener
17.1 first fastener
17.2 second fastener
18 striation lines
19 quilting
20 new embodiment of a paw pad
22 aerated pad
23.1 first extending section
23.2 second extending section
23.3 third extending section
23.4 Fourth extending section
24 adhesive section
25 adhesive section
26 adhesive section
27 adhesive section
28 adhesive section
29 tab 30 additional pad embodiment
32 striated pad with striation lines
33.1 first extending section
33.2 second extending section
33.3 third extending section
34 first adhesive section
35 second adhesive section
36 third adhesive section
37 fourth adhesive section
38 fifth adhesive section
39 tab
40 additional embodiment
42 quilted pad with quilting
43.1 first extending section
43.2 second extending section
44 Adhesive
45 adhesive
46 adhesive
47 adhesive
48 adhesive
49 Tab Accordingly, while at least one embodiment of the present invention has been shown and described, it is to be understood that many changes and modifications may be made thereunto without departing from the spirit and scope of the invention as defined in the appended claims.

What is claimed is:

1. An animal paw pad comprising:
a) a base having an enclosure, wherein said base has a first side and a second side disposed opposite of said first side and a perimeter;
b) a gel disposed inside of said enclosure;
c) at least one adhesive coupled to said first side;
d) a plurality of separate roughened sections coupled to said second side wherein said plurality of separate roughened sections are disposed opposite said adhesive and wherein said base extends radially out beyond said plurality of roughened sections to said perimeter, wherein the adhesive is configured to be positioned according to a paw structure of a dog and wherein said plurality of roughened sections are bound by said perimeter; and
e) a flexible tab coupled to the base, said tab formed integral with said base, and extending out from said base, wherein when said pad is coupled to an animal's paw, the tab is configured to extend away from a back heel of the paw wherein said tab is configured to allow for additional cushioning and to allow said base to be peeled away from the animal's paw wherein the paw pad and the tab are made from soft edible materials.

2. The animal paw pad as in claim 1, wherein said pad enclosure comprises silicon.

3. The animal paw pad as in claim 1, wherein said enclosure is opaque.

4. The animal paw pad as in claim 1, wherein said gel is made from silicon.

5. The animal paw pad as in claim 1, wherein said at least one adhesive is in the form of a gel.

6. The animal paw pad as in claim 1, wherein said at least one roughened section comprises a fabric, or non-permeable barrier.

7. The animal paw pad as in claim 1, wherein said at least one roughened section comprises a plurality of roughened sections and wherein said base comprises a solid gel area disposed around a periphery of the pad.

8. The animal paw pad as in claim 1, wherein said at least one adhesive comprises a plurality of different adhesive sections disposed on said first side of said enclosure wherein a top side has a plurality of small oval adhesive patches configured to adhere to the pressure points on the bottom of a dog's paw and disposed on an opposite side of said base are a plurality of roughened sections which are disposed approximately opposite said plurality of different adhesive sections.

9. The animal paw pad as in claim 1, wherein said tab is a gel tab made from a flexible material.

10. The animal paw pad as in claim 1, further comprising a strap.

11. The animal paw pad as in claim 1, wherein said base has an enclosure having a first portion having a gel section and a second portion having a gel and quilt section.

12. The animal paw pad as in claim 1, wherein said base has an enclosure having a first section having a gel and a second section having a solid gel section.

13. The animal paw pad as in claim 1, further comprising a strap.

14. The animal paw pad as in claim 1, wherein the base further comprises striation lines.

15. The animal paw pad as in claim 1, wherein the pad is a two layer pad with a first layer positioned adjacent to a dog's paw and a second layer positioned to be an exterior layer for contact with the ground, wherein the pad is configured to protect a dog's paw from extreme heat or cold.

16. The pad as in claim 1, wherein at least one side of the pad has a surface of aerated gel.

17. The animal paw pad as in claim 8, wherein the plurality of small oval patches comprises five patches.

18. The animal paw pad as in claim 9, wherein said enclosure is in a substantially circular shape.

19. The animal paw pad as in claim 10, wherein said strap is configured to wrap around an animal's paw.

20. The animal paw pad as in claim 13, wherein said strap comprises a fastener.

21. The animal paw pad as in claim 20, wherein said fastener is a hook and loop fastener.

22. An animal paw pad comprising:
a) a base having an enclosure, wherein said base has a first side and a second side disposed opposite of said first side and a perimeter;
b) a gel disposed inside of said enclosure;
c) at least one adhesive coupled to said first side;
d) a plurality of separate roughened sections coupled to said second side wherein said plurality of separate roughened sections are disposed opposite said adhesive wherein the adhesive is configured to be positioned according to a paw structure of a dog wherein said base extends radially out beyond said plurality of roughened sections to said perimeter, and wherein said plurality of roughened sections are disposed within said perimeter;
e) a solid gel area disposed around said perimeter of said base of the pad; and
f) a flexible tab extending out from a back of the base, wherein the paw pad and the tab are made from soft edible materials.

23. The pad as in claim 22, wherein said pad comprises a plurality of different layers comprising at least a first layer and a second layer.

24. The pad as in claim 23, wherein said first layer comprises a quilted gel region.

25. The pad as in claim 23, wherein said first layer comprises a gel region.

26. The pad as in claim 24, wherein said second layer comprises a striation gel region.

27. The pad as in claim 25, wherein said second layer comprises a striation gel region.

28. The pad as in claim 27, wherein said tab is a flexible gel tab coupled to the base, said tab formed integral with said base, and extending out from said base, said tab configured to extend out from a back of an animal's paw and provide additional cushioning to the animal's paw and to allow said base to be peeled away from the animal's paw and wherein at least one side of the pad has a surface comprising aerated gel.

* * * * *